United States Patent [19]

Somer

[11] Patent Number: 4,809,306

[45] Date of Patent: Feb. 28, 1989

[54] RF MODEM WITH IMPROVED CLOCK RECOVERY CIRCUIT

[75] Inventor: Gerald L. Somer, Sebastopol, Calif.

[73] Assignee: AMP Incorporated, Harrisburg, Pa.

[21] Appl. No.: 931,573

[22] Filed: Nov. 17, 1986

[51] Int. Cl.$^4$ ............................................. H04B 7/04
[52] U.S. Cl. ..................................... 375/120; 331/17; 331/25
[58] Field of Search ..................... 375/76, 77, 81, 120; 331/1 A, 10, 15, 17, 25; 328/133, 134; 455/260, 265

[56] References Cited

U.S. PATENT DOCUMENTS

| | | | |
|---|---|---|---|
| 3,707,683 | 12/1972 | Dotter, Jr. | 328/139 |
| 4,122,397 | 10/1978 | Thomas | 328/139 |
| 4,535,459 | 8/1985 | Hogge, Jr. | 375/80 |
| 4,625,180 | 11/1986 | Itaya et al. | 331/25 |
| 4,649,551 | 3/1987 | Sander et al. | 331/17 |
| 4,667,170 | 5/1987 | Lofgren et al. | 331/25 |
| 4,677,395 | 6/1987 | Baker | 331/25 |
| 4,689,581 | 8/1987 | Talbot | 331/17 |
| 4,712,077 | 12/1987 | Ansell et al. | 331/25 |

FOREIGN PATENT DOCUMENTS 2568738 2/1986 France .
54-148411 10/1979 Japan .

OTHER PUBLICATIONS

Patent Abstracts of Japan, vol. 4, No. 8, (E-1666), 22nd Jan. 1980, p. 87E166.

Primary Examiner—Benedict V. Safourek
Attorney, Agent, or Firm—David L. Smith

[57] ABSTRACT

In recovering clock information from received data, the voltage input to a voltage controlled oscillator (Q1) forming part of a phase locked loop (Q1, U3A, U2A, U3B, R10, C12, U4) is determined by comparing a voltage signal to a voltage reference that is precisely the midpoint of the voltage swing between a logic 0 and a logic 1 in the circuit. The voltage reference is generated using an exclusive OR gate (U3B) having one input tied to either the circuit voltage representing a logic 0 or the circuit voltage representing a logic 1. The second input to the exclusive OR gate (U3B) switches between a logic 1 and a logic 0 periodically such that the output of the exclusive OR gate (U3B) switches between the voltage level of a logic 1 and the voltage level of a logic 0 with a 50 percent duty cycle. An exclusive OR gate (U3C) is also used as a phase detector (U3C) to detect the phase difference between a clock signal derived from the phase locked loop oscillator output and the received data. The phase detector (U3C) output is compared (U4) to the reference voltage; any difference therebetween adjusts the input voltage to the voltage controlled oscillator and therefore the output frequency of the oscillator (Q1) to maintain a phase difference between the clock signal (CLK) derived from the oscillator (Q1) output and the clock signal in the incoming data to permit sampling the incoming data at a 90 degree phase shift. The voltage reference (U3B) and phase detector (U3C) exclusive OR gates are fabricated on the same wafer and have the same resistive load (R10, R12). In this manner, the voltage reference generated by the exclusive OR gate remains precisely at the midpoint of the voltage swing between logic level 0 and logic level 1, inherently compensating for changes in temperature and other effects.

21 Claims, 5 Drawing Sheets

RF MODEM WITH IMPROVED CLOCK RECOVERY CIRCUIT

The present invention is related to the following concurrently filed, copending applications all of which have been assigned to the same assignee as the present application, each of which is incorporated herein by reference, and include:

Application Ser. No. 931,576, "RF Modem with Improved Binary Transversal Filter", filed Nov. 17, 1986, by G. Somer and P. Walp;

Application Ser. No. 931,765, "RF Modem with Oscillator Switching Circuit", filed Nov. 17, 1986, by G. Somer; and Application Ser. No. 932,140, "Temperature Independent, Low Level, AM Modem Receiver", by G. Somer.

BACKGROUND OF INVENTION

This invention relates to radio frequency modulation and in particular to a radio frequency modem having an improved clock recovery circuit.

A radio frequency modem must receive data transmitted by another modem or by a head-end. Although the data transmission rate for a network is typically specified, slight differences in transmission rates may exist for many reasons including temperature variations and tolerances. In a network designed in accordance with IEEE specification 802.4, which is hereby incorporated by reference, the head-end is required to be the source of all data timing on the network.

It is desirable to sample received data at precise locations to assure accurate interpretation of the data. Since the clock within the receiving modem is not synchronized with the clock of the head-end or a transmitting modem, and since other factors such as temperature variations and tolerances make it impossible to solely use a clock in the receiving modem to determine precisely when to sample the incoming data, timing information used by a transmitting modem to send data must be recovered from data upon its receipt by a receiving modem.

Typical prior art clock recovery or timing recovery circuits employ a phase-locked loop having a voltage controlled oscillator. The input voltage to the voltage controlled oscillator is controlled as the difference between a voltage reference and another signal. Typically the voltage reference has been established using a voltage divider network or potentiometer and required compensation or adjustment for variations in temperature and other factors.

While the performance of clock recovery circuits having prior art voltage references have proven to be satisfactory, it is desirable to have a voltage reference that does not require adjustment or compensation for such variables as a change in temperature. Such a voltage reference would provide a clock recovery circuit yielding precise clock information.

SUMMARY OF THE INVENTION

In accordance with the present invention, the voltage input to a voltage controlled oscillator forming part of a phase locked loop is determined by comparing a voltage signal to a voltage reference that is precisely the midpoint of the voltage swing between a logic 0 and a logic 1 in the circuit. The voltage reference is generated using an exclusive OR gate having one input tied to either the circuit voltage representing a logic 0 or the circuit voltage representing a logic 1. The second input to the exclusive OR gate switches between a logic 1 and a logic 0 periodically such that the output of the exclusive OR gate switches between the voltage level of logic 1 and the voltage level of a logic 0 with a 50 percent duty cycle.

An exclusive OR gate is also used as a phase detector to detect the phase difference between a clock signal derived from the phase locked loop oscillator output and the received data. The phase detector output is compared to the reference voltage; any difference therebetween adjusts the input voltage to the voltage controlled oscillator and therefore the output frequency of the oscillator to maintain a phase difference between the clock signal derived from the oscillator output and the clock signal in the incoming data to permit sampling the incoming data at a 90 degree phase shift. The voltage reference and phase detector exclusive OR gates are fabricated on the same wafer and have the same resistive load. In this manner, the voltage reference generated by the exclusive OR gate remains precisely at the midpoint of the voltage swing between logic level 0 and logic level 1, inherently compensating for changes in temperature and other effects.

DESCRIPTION OF THE PREFERRED EMBODIMENT

Figure 1:
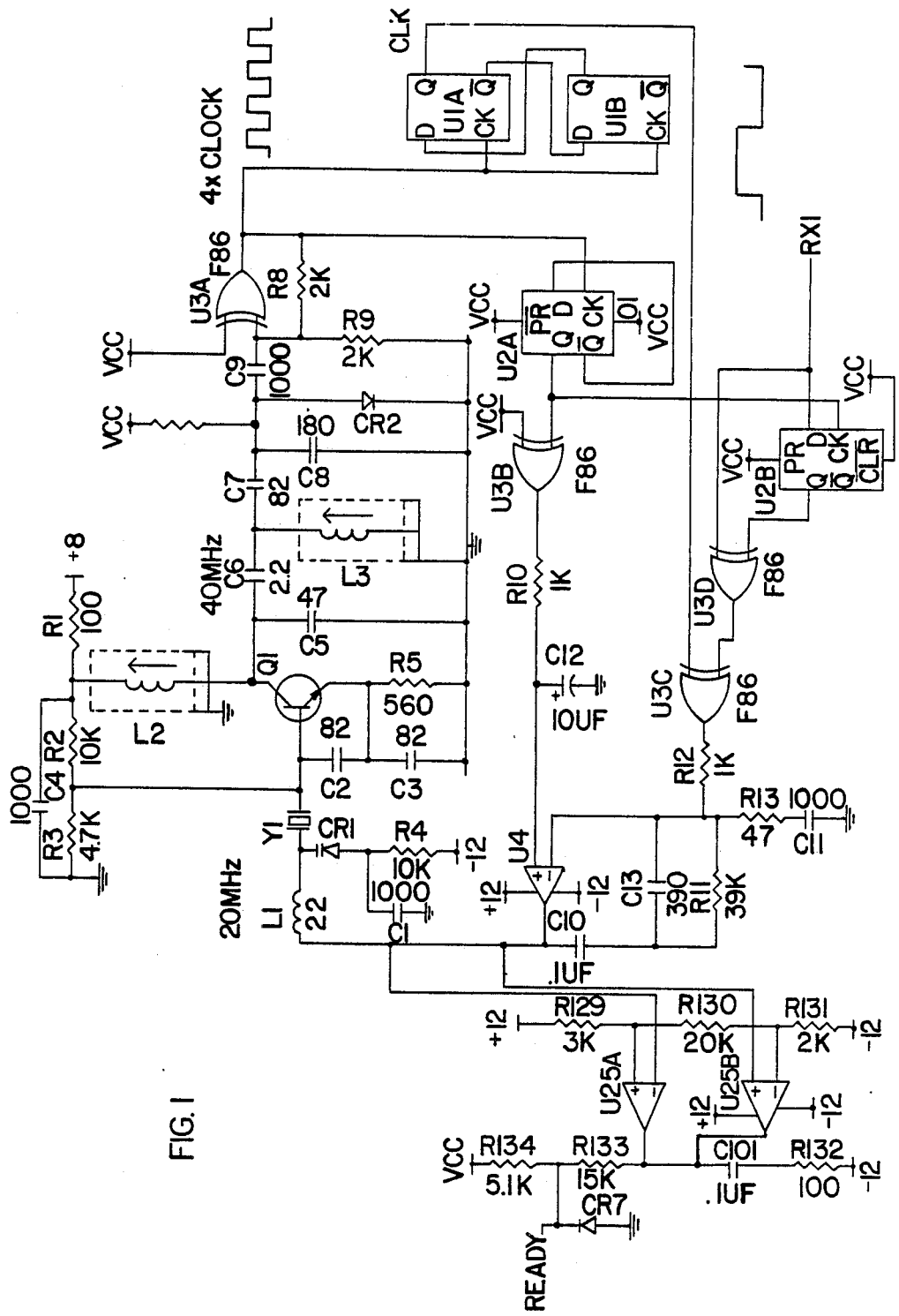
FIG. 1 is a circuit diagram having a voltage reference generated in accordance with the present invention.
Figure 4A:
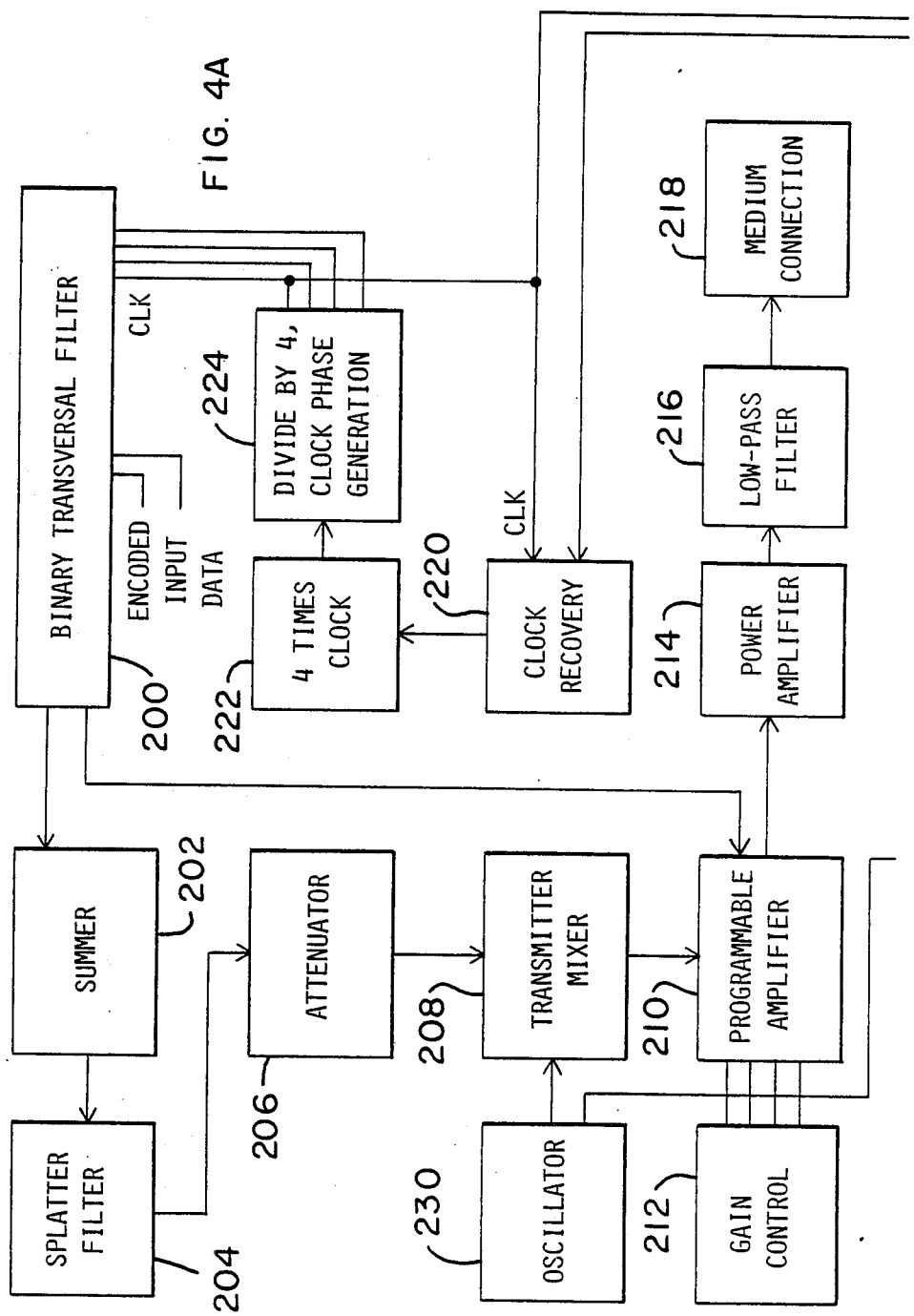
FIGS. 4A and 4B show respectively a radio frequency transmitter and receiver.
Figure 4B:
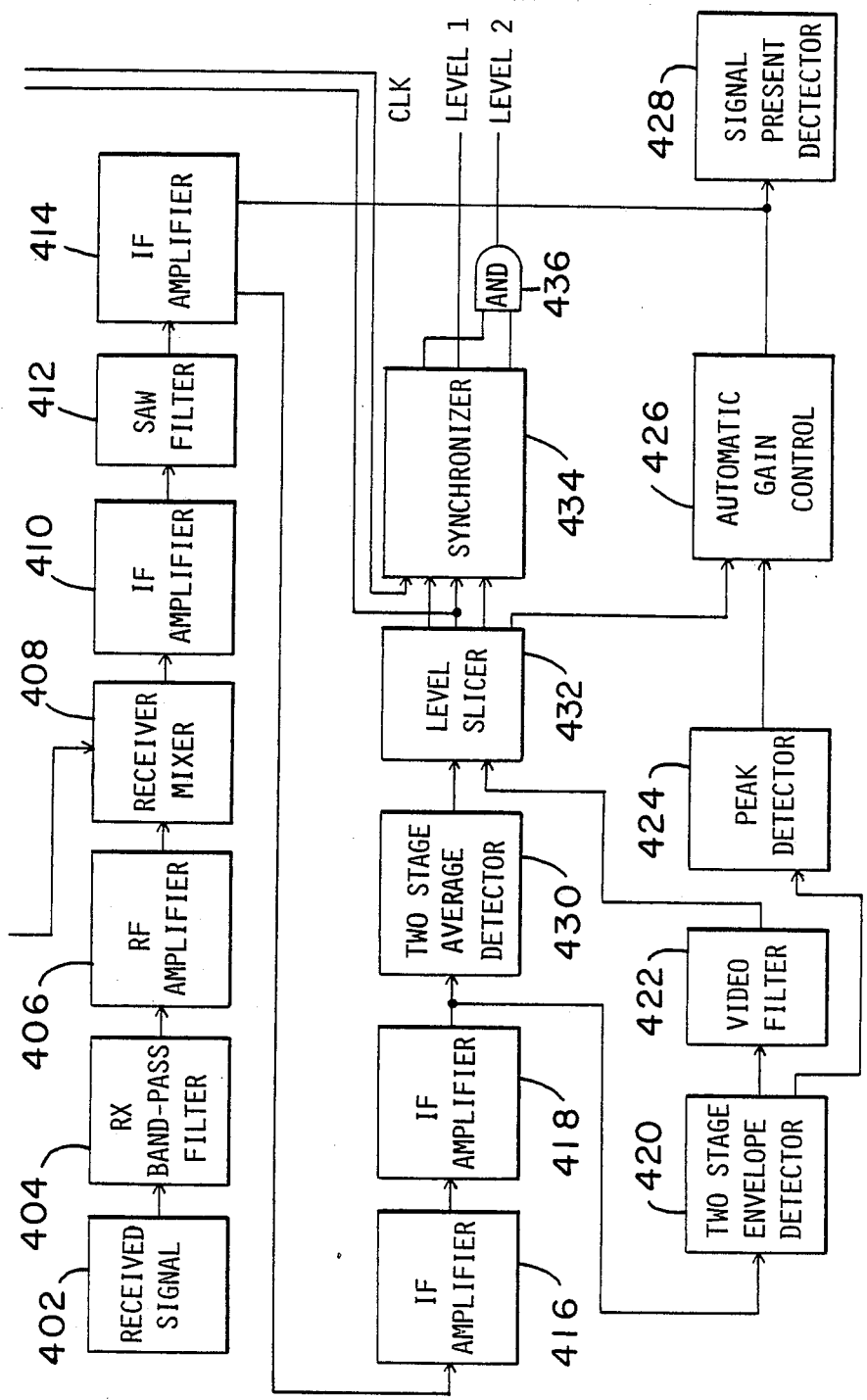

A phase locked loop is shown in FIG. 1 for recovering clock information from a received data signal. The clock recovery circuit is shown in the transmitter of FIG. 4A while the data stream is shown as generated from the received signal by the receiver in FIG. 4B. Clock recovery is a requirement of both the receiver and the transmitter in a radio frequency modem as it is necessary to recover the clock signal from the received signal and utilize the recovered clock signal in transmitting other signals. In the phase locked loop, transistor Q1 is a transistor oscillator, the frequency of which can be changed by varying the controlled voltage applied to the anode of varactor diode CR1. The oscillator runs at a fundamental frequency established by crystal Y1; the frequency is doubled in the collector of transistor Q1 and is then filtered. The filtered sinusoidal curve is converted into a logic level signal that is a square wave such as being applied to one input of an exclusive OR gate U3A with the other input to the exclusive OR gate tied to a voltage level representing one of the two logic states 0 or 1. The output of the exclusive OR gate thus configured is a logic level signal called 4XCLK that oscillates between logic 0 and logic 1 at a rate four times the clock rate. As shown in FIG. 1, the 4XCLK signal is provided to a pair of flip flops U1A, and U1B configured as a divide by four circuit that produces a clock signal CLK having a frequency one-fourth that of 4XCLK.

The 4XCLK signal is also divided by two other flip flops, U2A and U2B. Flip flop U2A produces a square wave output with a rate of one-half of that of 4XCLK. The output of flip flop U2A provides the clock signal to flip flop U2B. Flip flop U2B takes the data received and decoded by the radio frequency modem at RX1, representing binary data typically taking on the values of logic 1 and logic 0, and delays the data one-half of a CLK cycle in flip flop U2B.

Exclusive OR gate U3D receives RX1 as one input and the one-half bit delayed RX1 as the other input and adds the input signals together. The addition of RX1 and the one-half bit delayed RX1 signal causes the generation of clock components in the spectrum of the sum that did not exist before the processing. That is, the clock components did not exist in RX1 or in the delayed RX1 but they do exist in the summed output of the exclusive OR gate U3D. The output of U3D is applied as one input to exclusive OR gate U3C. The other input to exclusive OR gate U3C is the CLK signal as produced by flip flops U1A and U1B. Exclusive OR gate U3C operates as a phase detector. U3C detects any phase difference between the clock components in the output of U3D and the CLK signal from flip flop U1A.

Figure 2:
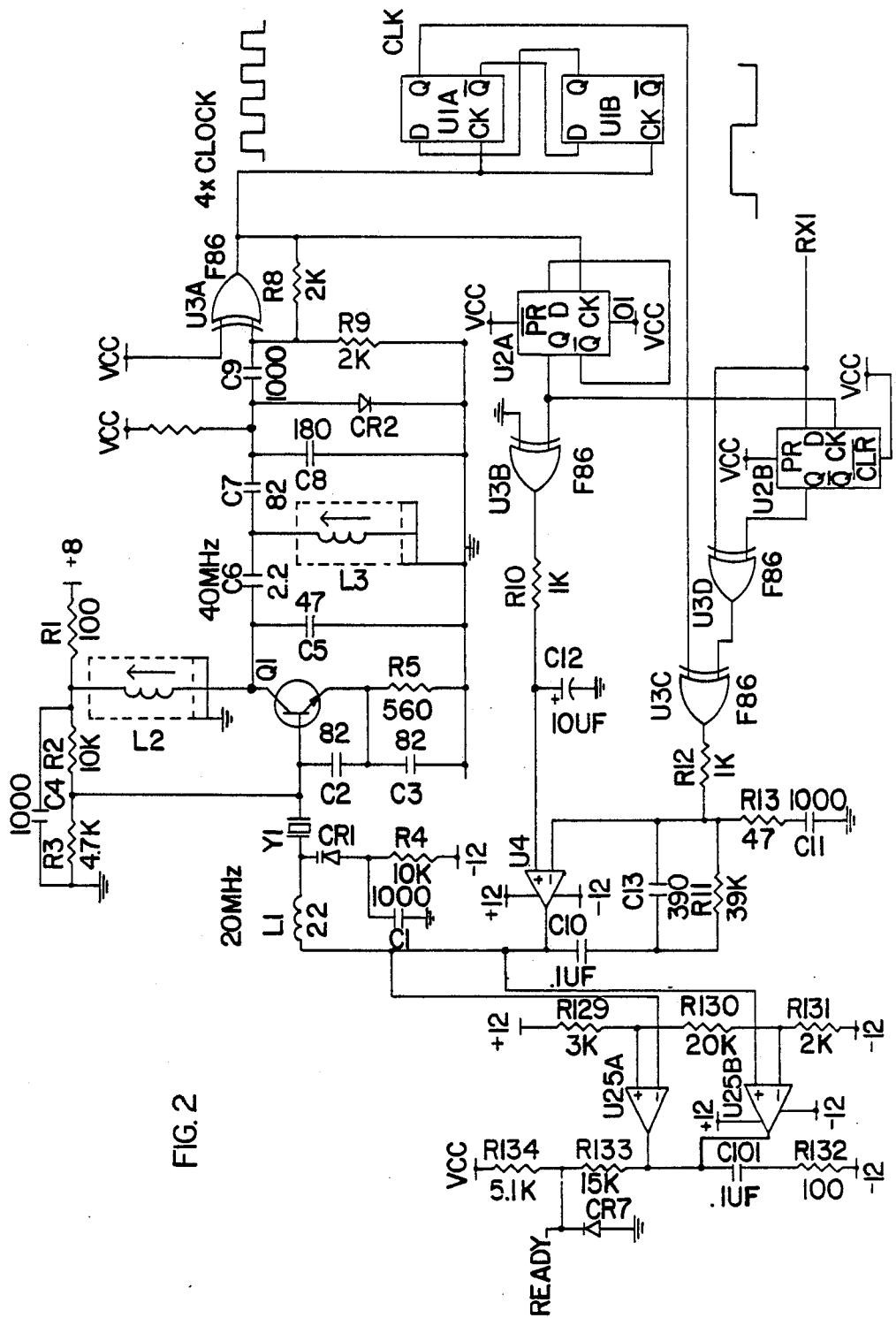
FIG. 2 is a circuit diagram disclosing an alternate embodiment of a voltage reference in accordance with the present invention.

The output of flip flop U2A also provides one of the inputs to exclusive OR gate U3B. The other input to U3B is tied to either one of the voltage references defining logic level 0 or logic level 1. FIG. 1 shows this input to exclusive OR gate U3B tied to voltage level VCC which represents logic level 1. FIG. 2 shows an alternate embodiment of a clock recovery circuit in which this input to exclusive OR gate U3B is shown tied to ground which represents the voltage level of a logic 0. Exclusive OR gate U3B in either embodiment thus produces at its output a square wave with a 50 percent duty cycle oscillating between logic level 1 and logic level 0. When filtered to determine the DC, the output of exclusive OR gate U3B develops a reference voltage that is precisely in the middle of the voltage swing between a logic 1 and a logic 0.

The reference voltage generated by exclusive OR gate U3B is applied to one input of U4, the output of phase detector U3C provides the other input to U4. To maintain matched operating conditions on exclusive OR gates U3B and U3C, the resistive load on the gates is the same. The output of U3B is provided to U4 through resistor R10; the output of U3C is provided to U4 through R12. Resistors R10 and R12 are the same magnitude, preferably precision resistors, to provide the same resistive load to U3B and U3C. A typical value is 1,000 ohms.

U4 is configured as a very high gain DC amplifier filter that turns the output of the phase detector into a DC voltage that is applied to varactor diode CR1 to control the frequency of the oscillator from which the clock signal is derived, thereby closing the feedback loop. The DC gain of U4 is very high as C10 blocks any DC resistive feedback; the AC gain of U4 varies with frequency as the feedback impedance of C10, C13 and R11 varies with frequency. The two inputs to operational amplifier U4 are forced to be at equal voltages in accordance with the operation of operational amplifiers and due to the feedback in the circuit.

The clock component in the output of U3C is forced to be 90° out of phase with respect to the clock in the data stream RX1 as processed by the one-half bit delay and add circuit of U2B and U3D. With the output of exclusive OR gate U3B maintained at precisely the midpoint of the voltage swing, the oscillator frequency is caused to change to drive the output of exclusive OR gate U3C to match the output of exclusive OR gate U3B, thereby forcing the recovered clock signal to be 90° out of phase with the incoming data so that sampling of the incoming data occurs at the precise point in the middle of the eye pattern.

It is preferable that the logic gate providing the voltage reference, exclusive OR gate U3B, be on the same wafer as the logic gate functioning as a phase detector, exclusive OR gate U3C, as they therefore are matched, have the same saturating characteristics, are at the same temperature and are subject to the same temperature variations. Since U3B and U3C are matched and have the same resistive load, no adjustment or other compensation is required to maintain the reference voltage precisely at the midpoint in the logic swing as any temperature change affects both U3B and U3C concurrently thereby inherently compensating for any temperature variations. This inherent temperature stability makes the clock very stable relative to the sampling point on the data and provides the ability to sample the data precisely in the middle of the eye pattern.

Resistors R129, R130 and R131 form a voltage divider. The voltage between the common point of R129 and R130 and the common point of R130 and R131 define a voltage range for the output of U4 where the phase locked loop is locked up and the clock information has been recovered. The voltage at the common point of R129 and R130 provides the positive input to differential amplifier U25A; the voltage output from U4 provides the negative input thereto. When the voltage output of U4 exceeds the voltage at the common point between R129 and R130, the logic state of comparator U25A changes indicating the clock information is not being recovered.

Similarly, the voltage at the common point of R130 and R131 provides the negative input to differential amplifier U25B; the voltage input from U4 provides the positive input thereto. When the voltage output of U4 decreases below the voltage at the common point between resistors R130 and R131, the logic state of comparator U25B changes indicating the clock information is not being recovered.

Figure 3:
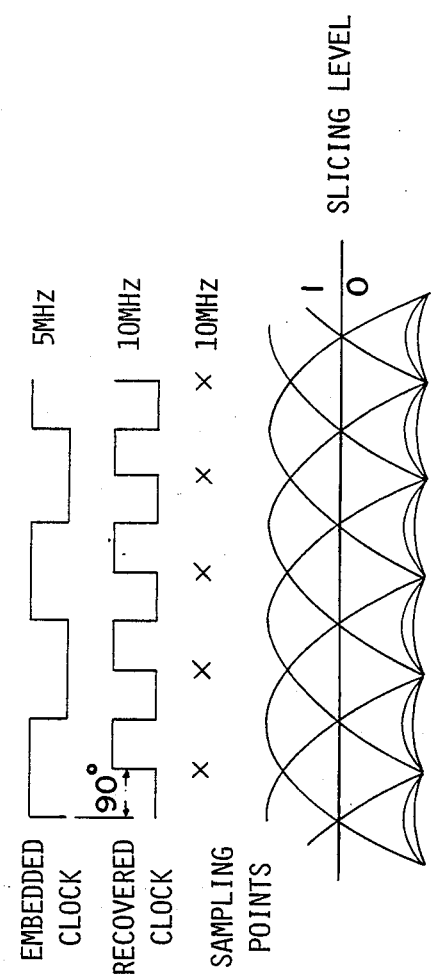
FIG. 3 shows a typical, random data stream eye pattern.

A typical eye pattern is shown in FIG. 3. The clock signal at the middle of the figure represents the recovered clock signal; the vertical lines marked by "x's" are the sampling points at the center of the eye pattern. The clock signal at the very top of the figure represents the clock, after duobinary encoding, of the modem or head-end that transmitted the data. The 90° phase shift is evident between the two clock signals. Note that prior to duobinary encoding, the clock is 10 MHz. After encoding the 'embedded' clock is 5 MHz.

An eye pattern which repeats at the clock rate may be generated using an oscilloscope adjusted to trigger on each clock pulse. With the data applied to the horizontal input of the oscilloscope, the path of the trace represents data. The path the trace takes depends upon the data bit concurrent with triggering but also depends upon previous data bits as there is energy stored in folters. A typical eye would represent all possible combinations of data. Any blurring of the eye is due to intersymbol interference. It is desired to sample the data where the eye is most wide open to most accurately determine the data. A clock recovery circuit designed in accordance with the present invention forces the clock which is recovered to be 90 degrees out of phase with the incoming data so that sampling of the incoming data occurs exactly in the middle of the eye where the eye is most wide open with no adjustments required and with no drifting due to temperature variations.

I claim:

1. Apparatus for recovering timing information from a data stream, comprising
    digital circuit means for establishing a reference voltage signal at precisely the midpoint of the voltage levels representing a logic 0 and a logic 1;
    phase detector means for detecting the phase difference between a clock signal and the data stream, said phase detector means having a first input port for receiving the clock signal, a second input port for receiving the data stream and an output port at which the detected phase difference is presented;
    amplifier means for receiving the voltage reference signal and for receiving the detected phase difference and for amplifying the difference therebetween, said amplifier means having a first input port for receiving the voltage reference signal, a second input port for receiving the detected phase difference, and an output port at which the amplified difference signal is presented; and
    voltage controlled oscillator means for receiving the amplified difference signal, said voltage controlled oscillator producing an output signal having a frequency that varies with the amplified difference signal, said output signal providing the input to the first input port of said phase detector means.

2. Apparatus for recovering timing information from a data stream as recited in claim 1, further comprising:
    means for convertin the oscillator output signal to a square wave signal.

3. Apparatus for recovering timing information from a data stream as recited in claim 2, wherein the reference voltage signal establishing means further comprises an input port for receiving the square wave signal.

4. Apparatus for recovering timing information from a data stream as recited in claim 1, wherein the reference voltage establishing means comprises a logic gate, the output of which produces a 50 percent duty cycle signal oscillating between the voltage representing a logic 0 and the voltage representing a logic 1.

5. Apparatus for recovering timing information from a data stream as recited in claim 4, wherein the logic gate is an exclusive OR gate.

6. Apparatus for recovering timing information from a data stream as recited in claim 4, wherein one input to the logic gate is tied to the voltage level representing a logic 0.

7. Apparatus for recovering timing information from a data stream as recited in claim 4, wherein one input to the logic gate is tied to the voltage level representing a logic 1.

8. Apparatus for recovering timing information from a data stream as recited in claim 4, wherein one input to the logic gate switches between the voltage level representing a logic 0 and the voltage level representing a logic 1 at a rate that is a multiple of the oscillator output frequency.

9. Apparatus for recovering timing information from a data stream as recited in claim 4, wherein the phase detector means is comprised of a logic gate.

10. Apparatus for recovering timing information from a data stream as recited in claim 9, further comprising an identical resistive load on the phase detector logic gate and the reference voltage establishing logic gate.

11. Apparatus for recovering timing information from a data stream as recited in claim 9, wherein the phase detector logic gate and the reference voltage establishing logic gate are on the same chip.

12. Apparatus for recovering timing information from a data stream as recited in claim 11, further comprising an identical resistive load on the phase detector logic gate and the reference voltage establishing logic gate.

13. A modem having a clock recovery circuit for recovering timing information from a data stream, comprising:
    receiving means for receiving and decoding a radio frequency signal into a data stream; and
    a clock recovery circuit for recovering timing information from the data stream, comprising
    digital circuit means for establishing a reference voltage at precisely the midpoint of the voltage levels representing a logic 0 and a logic 1;
    phase detector means for detecting the phase difference between a clock signal and a data stream, said phase detector means having a first input port for receiving the clock signal, a second input port for receiving the data stream and an output port at which the detected phase difference is presented;
    amplifier means for receiving the voltage reference and for receiving the detected phase difference and for amplifying the difference therebetween, said amplifier means having a first input port for receiving the voltage reference signal, a second input port for receiving the detected phase difference, and an output port at which the amplifier difference signal is presented; and
    voltage controlled oscillator means for receiving the amplified difference signal, said voltage controlled oscillator producing an outut signal having a frequency that varies with the amplified difference signal, said output signal providing the input to the first input port of said phase detector means.

14. A modem as recited in claim 13, wherein the reference voltage establishing means comprises a logic gate, the output of which produces a 50 percent duty cycle signal oscillating between the voltage representing a logic 0 and the voltage representing a logic 1.

15. A modem as recited in claim 14, wherein the logic gate is an exclusive OR gate.

16. A modem as recited in claim 14, wherein one input to the logic gate is tied to the voltage level representing a logic 0.

17. A modem as recited in claim 14, wherein one input to the logic gate is tied to the voltage level representing a logic 1.

18. A modem as recited in claim 14, wherein the phase detector means is comprised of a logic gate.

19. A modem as recited in claim 18, further comprising an identical resistive load on the phase detector logic gate and the reference voltage establishing logic gate.

20. A modem as recited in claim 18, wherein the phase detector logic gate and the reference voltage establishing logic gate are on the same chip.

21. A modem as recited in claim 20 further comprising an identical resistive load on the phase detector logic gate and the reference voltage establishing logic gate.

* * * * *